(12) United States Patent
Juneja et al.

(10) Patent No.: US 10,498,852 B2
(45) Date of Patent: Dec. 3, 2019

(54) PREDICTION-BASED CACHING SYSTEM

(71) Applicant: eBay Inc., San Jose, CA (US)

(72) Inventors: Vanuj Juneja, San Jose, CA (US); Pravin Jadhav, Milpitas, CA (US); Shanmugapriya Pandiyan, San Jose, CA (US)

(73) Assignee: EBAY INC., San Jose, CA (US)

( * ) Notice: Subject to any disclaimer, the term of this patent is extended or adjusted under 35 U.S.C. 154(b) by 431 days.

(21) Appl. No.: 15/269,242

(22) Filed: Sep. 19, 2016

(65) Prior Publication Data

US 2018/0084074 A1 Mar. 22, 2018

(51) Int. Cl.
| | |
|---|---|
| *G06F 16/00* | (2019.01) |
| *H04L 29/08* | (2006.01) |
| *G06F 16/951* | (2019.01) |
| *G06F 16/9038* | (2019.01) |
| *G06F 16/9032* | (2019.01) |

(52) U.S. Cl.
CPC ...... *H04L 67/2842* (2013.01); *G06F 16/9038* (2019.01); *G06F 16/90324* (2019.01); *G06F 16/951* (2019.01)

(58) Field of Classification Search
CPC ......... G06F 17/30864; G06F 17/30991; G06F 17/3097; G06F 17/30; G06F 17/30463; G06F 17/30466; G06F 17/30477; G06F 12/023; G06F 17/30339; G06F 17/30371; G06F 17/30498; G06F 17/30569; G06F 2212/1044; G06F 2212/4012; G06F 16/90324; G06F 16/951; G06F 16/9038; G06F 16/00; G06F 17/30563; G06F 9/5038; G06F 17/30286; G06F 9/00; G06F 17/30545; G06F 17/30283; G06F 17/30575; G06F 17/3053; G06F 17/30377;

(Continued)

(56) References Cited

U.S. PATENT DOCUMENTS

| | | | |
|---|---|---|---|
| 7,761,497 B1 * | 7/2010 | O'Connell, Jr. .. | G06F 17/30902 709/201 |
| 8,990,242 B2 | 3/2015 | Mohiuddin et al. | |

(Continued)

OTHER PUBLICATIONS

U.S. Appl. No. 15/269,132, filed Sep. 19, 2016, Prediction-Based Instant Search.

*Primary Examiner* — Anh Ly
(74) *Attorney, Agent, or Firm* — Shook, Hardy & Bacon LLP

(57) ABSTRACT

Example embodiments provide a prediction-based caching system. The caching system receives an application program interface (API) request from a component of the client device. The request indicates a parameter for current requested information. The caching system causes a search of both a cache and a source for the current requested information based on the parameter. The caching system causes retrieval of the current requested information from one of the cache or the source. The caching system then transmits the current requested information to the component of the client device. The caching system also predicts a future request for information (or receives a predicted request for future information). The caching system retrieves predicted results based on the predicted request from the source, and stores the predicted results in a cache for faster retrieval.

34 Claims, 11 Drawing Sheets

(58) Field of Classification Search
CPC .......... G06F 17/30595; H04L 67/2842; H04L 67/42; H04L 29/08
See application file for complete search history.

(56) References Cited

U.S. PATENT DOCUMENTS

| | | | | |
|---|---|---|---|---|
| 2002/0138640 A1* | 9/2002 | Raz | ................... | H04L 29/06027 709/231 |
| 2007/0226320 A1* | 9/2007 | Hager | ................... | G06F 16/137 709/219 |
| 2008/0147971 A1* | 6/2008 | Hawkins | ................ | A63F 13/00 711/113 |
| 2008/0167907 A1* | 7/2008 | Marcken | ................ | G06Q 10/02 705/5 |
| 2010/0205292 A1* | 8/2010 | Diaz | ................ | H04L 12/40013 709/224 |
| 2012/0215816 A1* | 8/2012 | Kidron | ................ | G06F 15/167 707/803 |
| 2013/0339406 A1* | 12/2013 | Kanfi | ................ | G06F 17/30082 707/825 |
| 2014/0123295 A1* | 5/2014 | Kuykendall | .......... | G06F 21/577 726/25 |
| 2014/0223099 A1* | 8/2014 | Kidron | ................ | G06F 12/0806 711/118 |
| 2014/0337312 A1* | 11/2014 | Zhang | ................ | G06Q 30/0601 707/710 |
| 2015/0205828 A1 | 7/2015 | Manciero et al. | | |
| 2015/0363421 A1* | 12/2015 | Bortnikov | ......... | G06F 17/30174 707/610 |
| 2016/0198016 A1* | 7/2016 | Tiger | ................... | H04L 47/823 709/213 |
| 2016/0360336 A1* | 12/2016 | Gross | ................... | H04W 4/025 |
| 2016/0360382 A1* | 12/2016 | Gross | ................... | G06F 3/0488 |
| 2017/0024657 A1* | 1/2017 | Sahu | ....................... | G06N 7/02 707/E17.001 |
| 2018/0084074 A1* | 3/2018 | Juneja | ................ | H04L 67/2842 707/E17.045 |

\* cited by examiner

PREDICTION-BASED CACHING SYSTEM

TECHNICAL FIELD

The subject matter disclosed herein generally relates to machines configured to the technical field of special-purpose machines that facilitate providing a prediction-based caching system including computerized variants of such special-purpose machines and improvements to such variants, and to the technologies by which such special-purpose machines become improved compared to other special-purpose machines that facilitate providing a prediction-based caching system.

BACKGROUND

In conventional search embodiments, a search is conducted when a user enters and submits (e.g., hits "enter" button) a search term. In some cases, it may take about two seconds for results to be returned and displayed. During this time, the user may have already typed ahead (e.g., entered more search terms). This latency in returning search results may not only be annoying to the user, but may also slow down the entire search process.

BRIEF DESCRIPTION OF THE DRAWINGS

Some embodiments are illustrated by way of example and not limitation in the figures of the accompanying drawings.

DETAILED DESCRIPTION

Figure 1:
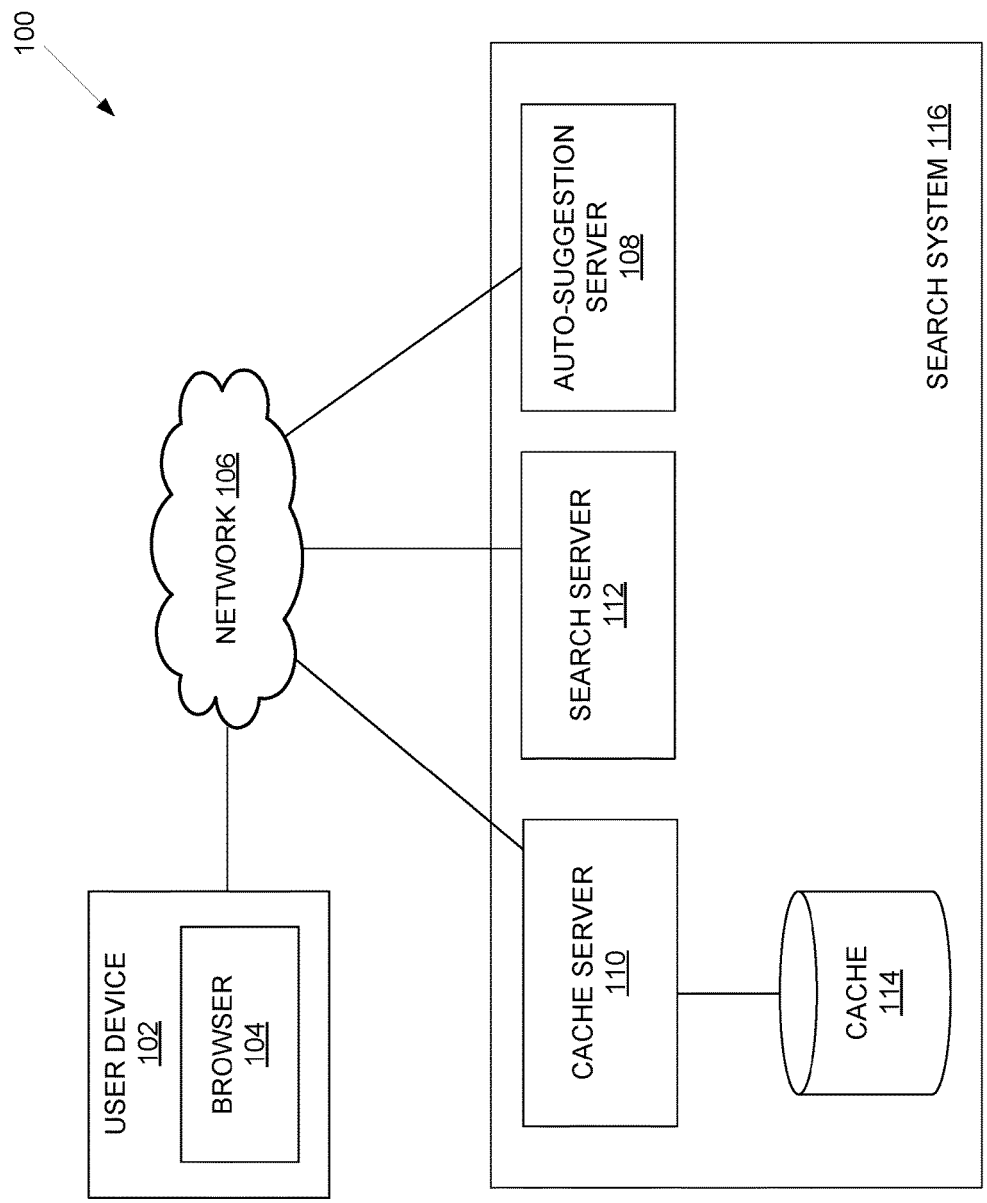
FIG. 1 is a network diagram illustrating a network environment suitable for providing prediction-based instant search results, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) facilitate providing a prediction-based caching system, and example systems (e.g., special-purpose machines) are configured to provide prediction-based caching. In particular, example embodiments provide mechanisms and logic that provide prediction-based caching. More specifically, the caching system receives an application program interface (API) request from a component of the client device. The request indicates a parameter for current requested information. Substantially simultaneously, the caching system causes a search of both a cache and a source for the current requested information based on the parameter. The caching system causes retrieval of the current requested information from one of the cache or the source. The caching system then transmits the current requested information to the component of the client device. The caching system also predicts a future request for information (or receives a predicted request for future information). The caching system retrieves predicted results based on the predicted request from the source, and stores the predicted results in a cache for faster retrieval.

As a result, one or more of the methodologies described herein facilitate solving the technical problem of providing prediction-based caching. The methodologies include receiving an application program interface (API) request from a component of the client device that indicates a parameter for current requested information. The logic, substantially simultaneously, causes a search of a cache and a source for the current requested information based on the parameter. The logic causes retrieval of the current requested information from one of the cache or the source, and transmits the current requested information to the component of the client device. The logic also predicts a future request for information (or receives a predicted request for future information). The logic retrieves predicted results based on the predicted request from the source, and stores the predicted results in a cache for faster future retrieval.

FIG. 1 is a network diagram illustrating a network environment 100 suitable for providing prediction-based instant search results, according to some example embodiments. The network environment 100 includes a user device 102 having a browser or a similar application (collectively referred to as "browser 104") communicatively coupled via a network 106 to an auto-suggestion server 108 and a cache server 110. The user device 102 is also communicatively coupled to a search server 112, either directly or through the cache server 110. The cache server 110 is further coupled to one or more cache(s) 114.

The user device 102 may comprise, but is not limited to, a smartphone, tablet, laptop, multi-processor system, microprocessor-based or programmable consumer electronics, game console, set-top box, or any other device that a user utilizes to communicate over the network 106. In some embodiments, the user device 102 may comprise a display module (not shown) to display information (e.g., in the form of user interfaces). In some embodiments, the user device 102 may comprise one or more of a touch screen, camera, keyboard, microphone, and Global Positioning System (GPS) device. The user device 102 may be a device of a user, which is used to display information, perform searches, or navigate to particular information, for example, by using the browser 104. The browser 104 will be discussed in more detail in connection with FIG. 2.

One or more portions of the network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 106 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The auto-suggestion server 108 is configured to manage auto-suggestions or predictions of keywords or search terms based on a current input. In example embodiments, the auto-suggestion server 108 receives a current input, and in response, returns suggested keywords or search terms that can, for example, complete the current input. For example, if the current input is "ipa," the auto-suggestion server 108 may return a list of auto-suggestions (e.g., keywords, terms, phrases) such as: ipad, ipad air, ipad air 2, ipad mini, and ipad mini case. The auto-suggested keywords or search terms are based on historical data or treads (e.g., people that entered the current input eventually completed the input with the predicted keywords or selected the predicted keywords/auto-suggestions). As such, the auto-suggestion server 108 is couple to a database (not shown) that stores historical data, trends, or predetermined (e.g., processed beforehand based on historical data or trends) predicted keywords or search terms.

In some example embodiments, the cache server 110 receives (or intercepts) information requests, such as a search query, that are directed to the search server 112. Using parameters from the information request or search query, the cache server 110 accesses a cache 114 and, in some embodiments, makes a search API call to the search server 112 for requested information. The cache server 110 is described in more detail in connection with FIG. 3 below, and may be implemented in a computer system, as described below with respect to FIG. 11.

The search server 112 is configured to perform a search for information in response to the search API call. In one embodiment, the search server 122 is associated with a publication system and performs searches for publications (e.g., listings, posts).

In some example embodiments, any two or more of the auto-suggestion server 108, the cache server 110, the search server 112, and the cache 114 form all or part of a search system 116 that provides search results to the user device 102. The search system 116 may comprise an internal network for its components to communicate. In certain example embodiments, the search system 116 is a data provisioning system that provides requested information to the user device 102 as will be discussed in more detail in connection with FIG. 10.

Any of the servers, databases (e.g., cache 114), or devices (each also referred to as a "machine") shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 11. As used herein, a "database" or "cache" is a data storage resource and may store data structured as a text file, a table, a spreadsheet, a relational database, a triple store, a key-value store, or any suitable combination thereof. Moreover, any two or more of the machines illustrated in FIG. 1 may be combined into a single machine, and the functions described herein for any single machine may be subdivided among multiple machines.

Figure 2:
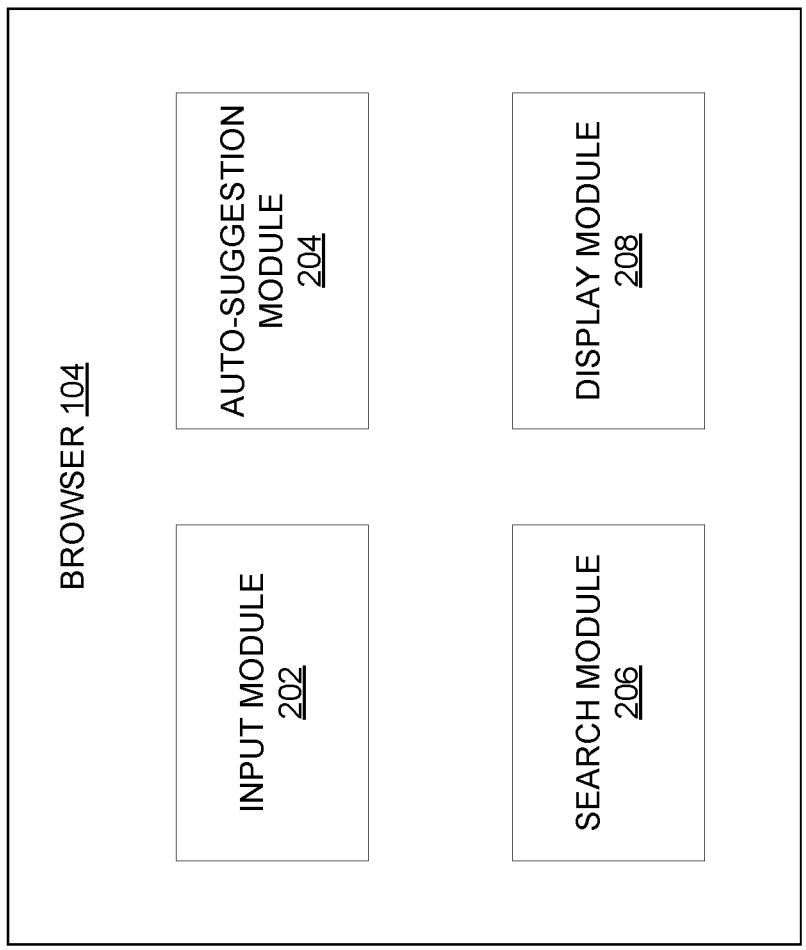
FIG. 2 is a block diagram illustrating components of a browser, according to some example embodiments.

FIG. 2 is a block diagram illustrating components of the browser 104, according to some example embodiments. The browser 104 includes an input module 202, an auto-suggestion module 204, a search module 206, and a display module 208, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The input module 202 manages inputs entered by a user in a search field of a user interface. In example embodiments, the input module 202 monitors the input as the user is entering characters (e.g., alpha-numeric characters) in the search field. As soon as a predetermined number of characters has been entered into the search field (e.g., three characters), the input module 202 triggers the auto-suggestion module 204 (e.g., by transmitting currently entered characters to the auto-suggestion module 204) to perform operations. The input module 202 also continues to monitor for each successive character entered in the search field, which may trigger a further call by the auto-suggestion module 204 or the search module 206 to be made, as discussed in more detail below. The input module 202 also monitors for a submission of a complete input entered in the search field. The submission of the complete input may be detected by a selection of an "enter" or submission selection (e.g., button) or a selection of auto-suggested keywords, terms, or phrases (collectively referred to as "auto-suggestions").

The auto-suggestion module 204 is configured to manage an auto-suggestion process at the browser 104. In example embodiments, the auto-suggestion module 204 generates an auto-suggestion API request (e.g., to make an auto-suggestion API call) using a current input (e.g., currently entered characters) detected by and received from the input module 202. Returning to the above example, the input module 202 detects the current input "ipa" and triggers the auto-suggestion module 204 to generate the auto-suggestion API request with "ipa" as a parameter in the request. The auto-suggestion module 204 then transmits the auto-suggestion API request (e.g., makes the auto-suggestion API call) to the auto-suggestion server 108. Subsequently, the auto-suggestion module 204 receives, in response to the auto-suggestion API call, a list of one or more auto-suggestions if available or known. The auto-suggestion module 204 provides the auto-suggestions to the display module 208 which presents the auto-suggestions, for example, in a drop down menu under the search field. The auto-suggestion module 204 also transmits the auto-suggestions to the search module 206 as predictions for potential future queries which may be submitted by the user. As such, the auto-suggestion module 204 not only provides recommendations (e.g., auto-suggestions) to the user, but also initiates a search for results for the recommendations before any selection of the recommendation is made and while the user may still be entering characters into the search field to complete their input.

The search module 206 is configured to manage a search process at the browser 104. In example embodiments, the search module 206 generates a search API request (e.g., to make a search API call) using the current input (e.g., "ipa") and one or more auto-suggestions (e.g., ipad, ipad air, ipad air 2, ipad mini, and ipad mini case) as parameters. In some example embodiments, the search module 206 automatically generates the search API request in response to the auto-suggestion module 204 receiving the list of auto-suggestions. For example, the auto-suggestion module 204 receives the list of auto-suggestion and transmits the list of auto-suggestions to the search module 206, which automatically generates the search API request that includes the current input and one or more of the auto-suggestions as parameters. The search module 206 then transmits the search API request (e.g., makes the search API call) to the search system 116 (e.g., the cache server 110). The search module 206 receives, in response to the search API call, results for the current input. In some embodiments, the results for the current input comprises some of the results determined, by the search system server 112, for one or more of the auto-suggestions.

In some embodiments, only a top number (e.g., first five) of auto-suggestions on the list are included as parameters in the request to the search system 116. In these embodiments, when the user, for example scrolls through the auto-suggestion list (e.g., hits a down arrow to maneuver through the menu) towards a last of the previously searched auto-suggestions, the search module 206 may send a next set of auto-suggestions (e.g., next five auto-suggestions) on the list to the search system 116. This process reduces the number of calls made (e.g., by the search module 206 as well as calls to the search system server 112). For example, if the user selects the second auto-suggestion in the displayed menu, no further API calls need to be made in order to cause searches for the next five auto-suggestions.

Returning to the example, the search module 206 generates a search API request with "ipa" (as the current input) and at least some of the auto-suggestions (e.g., ipad, ipad air, ipad air 2, ipad mini, and ipad mini case) as parameters. The search module 206 transmits the request (e.g., makes the search API call) to the search system 116. In response, the search module 206 receives results for the current input (also referred to as the "current results") which may include results for some of the auto-suggestions.

The display module 208 manages the display of information for the browser 104. In example embodiments, the display module 208 generates and causes display of user interfaces on the user device 102 as well as updates information displayed on the user interfaces. As such, the display module 208 causes the display of the auto-suggestions as the user may still be inputting characters in the search field (e.g., display in a drop down menu), and causes display of (e.g., updates the user interface to display) search results (e.g., current results) or other information received from the search system 116. Accordingly, results are displayed to the user as the user is still inputting characters for their search query in the search field. In some example embodiments, the current results and the auto-suggestions may be updated with each successive character entered into the search field.

Figure 3:
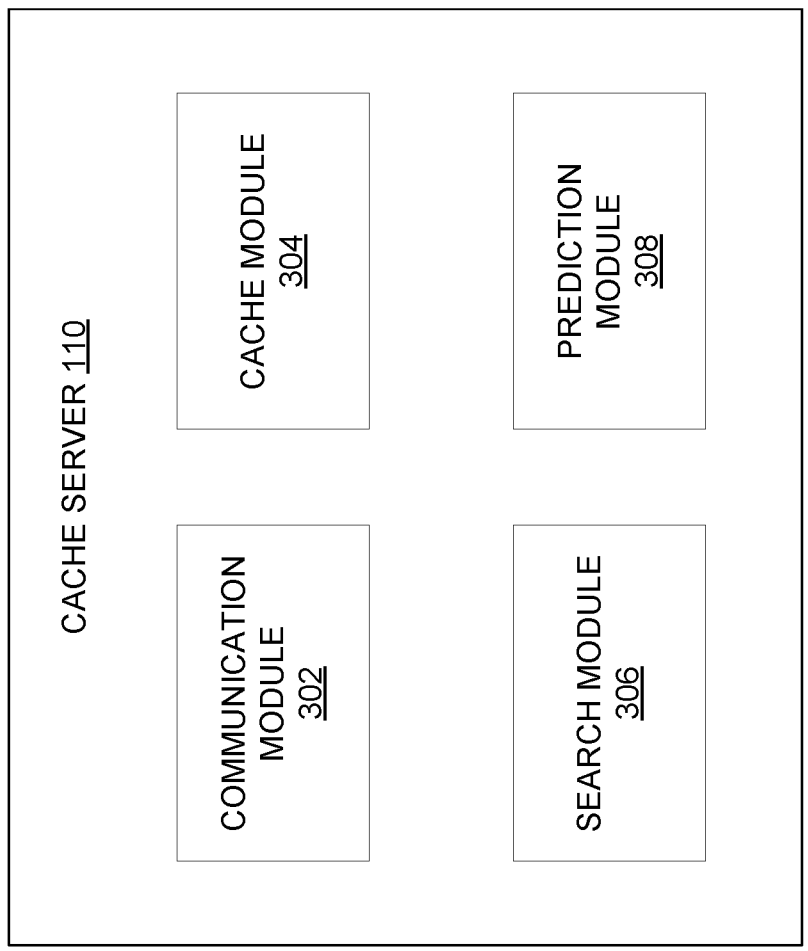
FIG. 3 is a block diagram illustrating components of a cache server, according to some example embodiments.

FIG. 3 is a block diagram illustrating components of the cache server 110, according to some example embodiments. The cache server 110 is a prediction based caching system that knows, or can predict, what queries or requests for information may be processed in the future. The cache server 110 can preemptively trigger the search server 112 to search for and return results for the predicted queries/requests (e.g., auto-suggestions). The cache server 110 caches the results for the predicted queries in order to provide faster results. To enable these operations, the cache server 110 comprises a communication module 302, a cache module 304, a search module 306, and a prediction module 308, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules. In some embodiments, some of the components or functions of the cache server 110 may be embodied elsewhere in the network environment 100, for example, at the client device 102 or the search server 112.

The communication module 302 is configured to manage communications with the browser 104 at the cache server 110. In particular, the communication module 302 receives the search API requests/calls from the browser 104 (e.g., from the search module 206). In some embodiments, the communication module 302 parses the search API request to identify the parameters to be searched (e.g., current input and the auto-suggestions). The communication module 302 also transmits the results obtained in response to the search API request back to the browser 104.

The cache module 304 is configured to manage operations associated with the cache 114. In example embodiments, the cache module 304 receives the current input from the communication module 302 and checks the cache 114 to determine if the cache 114 contains the results for the current input. The cache module 304 also stores predicted results received from the search server 112 to the cache 114 for potential later retrieval. The predicted results comprise results obtained based on predictions (e.g., auto-suggestions) of potential future information requests.

In some embodiments, the predicted results in the cache 114 are maintained for a particular user of the user device 102 for a current session or for a predetermined amount of time (e.g., 10 minutes). In other embodiments, the predicted results are shared between users at different user devices. In some of these embodiments, the users at the different user devices are grouped by locations or zones (e.g., region of a country, states, shipping zones) and the predicted results are assigned to particular groups. In other embodiments, a different cache 114 or search system 116 may be provided for each location or zone. The predicted results being shared between users in a same group may be maintained in the cache 114 for a predetermined amount of time (e.g., 15 minutes).

The search module 306 is configured to manage search operations at the cache server 110. In example embodiments, the search module 306 receives the parameters (e.g., current input and the auto-suggestions). The search module 306 then generates a search API request that includes the current input (also referred to as "current search request") and a search API request for each of the auto-suggestions (also referred to as "auto-suggestion request"), and transmits the search API requests (e.g., makes a current search API call and auto-suggestion API calls) to the search server 112.

The prediction module 308 is configured to predict future queries or requests for information based on a current request for information. The prediction module 308 is operable in embodiments where the cache server 110 does not receive auto-suggestions or other types of predictions from the browser 104 or client device 102. Instead, the prediction module 308 predicts based on a current request for information (e.g., current search request) for possible future requests for information. The prediction may be based on historical information (e.g., previous requests for information resulted in the predicted future requests) or hierarchical information (e.g., directory information, folder information). For example, if a current request is for a map of the United States, the predicted requests may include maps of various regions within the United States. In another example, if the current request is for particular directory or folder in a computer system, the predicted requests may include sub-directories within the particular directory or sub-folders within the particular folder. In yet another example, if the current request is for a particular page, the predicted requests may be for a next one or more pages after the particular page. Further still, in a video game example, if the current request is for a particular environment or level, the predicted requests may be for surrounding environments or levels. In some example embodiments, the prediction module 308 is optional in the cache server 110.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices, or be located elsewhere in the network environment 100.

Figure 4:
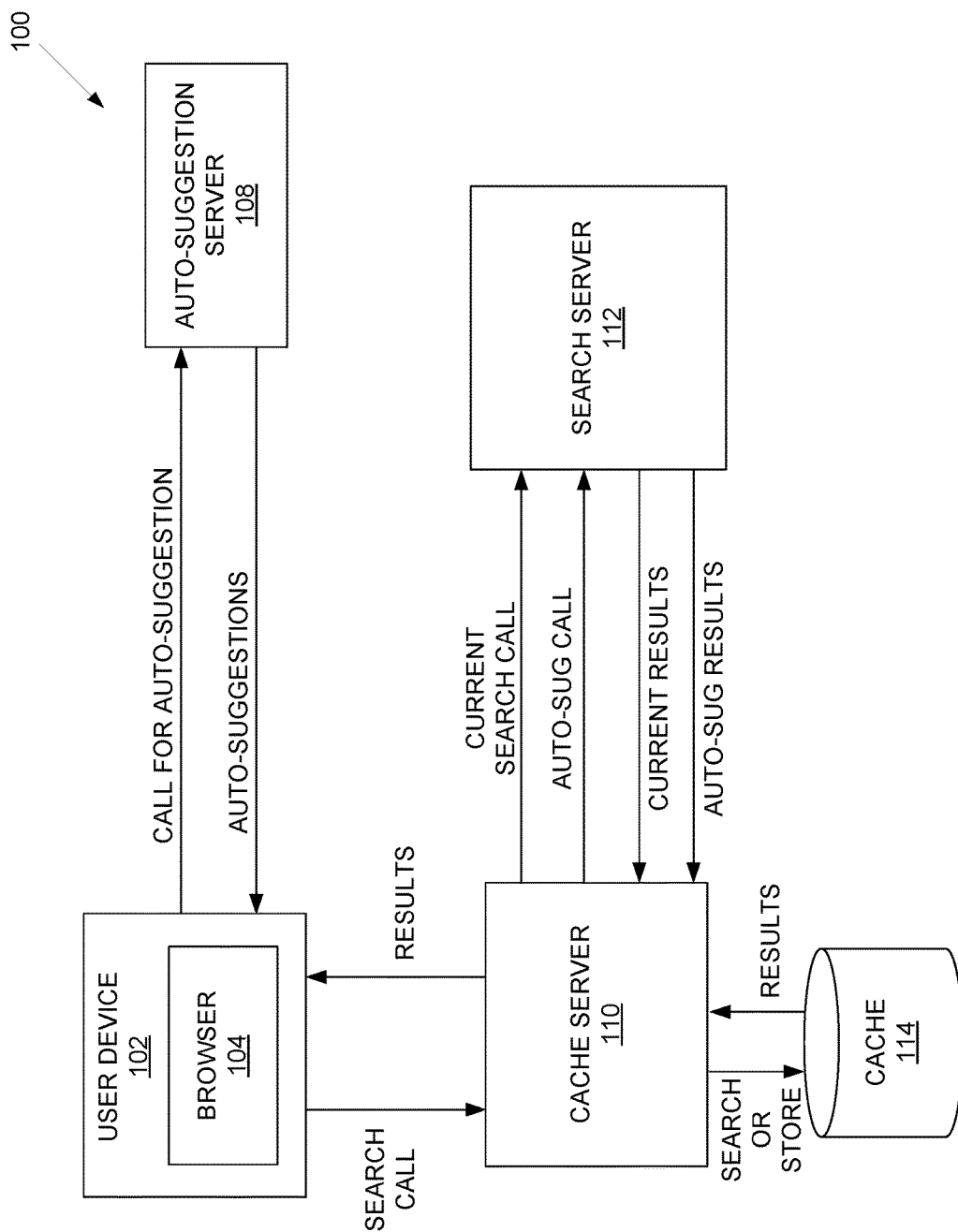
FIG. 4 is a diagram illustrating communication flows in the network environment, according to some example embodiments.

FIG. 4 is a diagram illustrating communication flows in the network environment 100, according to some example embodiments. Initially, a user at the user device 102 starts entering characters into a search field of a user interface displayed by the browser 104. A current input in the search field is monitored by the input module 202. Once a predetermined minimum number of characters is entered into the search field, the browser 104 makes a call to the auto-suggestion server 108 (e.g., auto-suggestion API) using the current characters in the search field as parameters. The auto-suggestion server 108 determines the auto-suggestions and returns the auto-suggestions to the browser 104. After the auto-suggestions are received by the browser 104, the browser 104 makes a call (e.g., search API call) to the search system 116 (e.g., intercepted or received by the cache server 110). The call includes the current input and at least some of the auto-suggestions as parameters.

The cache server 110 receives the search API request, and searches the cache 114 for current results while also sending a search request to the search server 112 (e.g., current search API call) with the current input. Based on whichever returns results first (likely the cache 114, but if nothing is stored on the cache 114, then the search server 112), a current result is returned to the browser 104. The current results are "instant" search results that are displayed by the browser 104 as the user is likely still entering characters in the search field. In an alternative embodiment, the cache server 110 searches the cache 114 first for the current results, and if no results are found, then sends the current search API request to the search server 112. This embodiment reduces the number of calls made to the search server 112 when the requested information is already cached at the cache 114.

Substantially simultaneously with the current search API call, the cache server 110 sends a request (e.g., auto-suggestion search API call) for each auto-suggestion (e.g., each set of keywords or terms such as "ipad," "ipad air," and "ipad mini") to the search server 112. The search server 112 performs a search for the requested information and returns the auto-suggestion results to the cache server 110. The cache server 110 stores the auto-suggestion results in the cache 114. Accordingly, when a next call is received from the browser 104, the results for a current input of the next call is likely already stored in the cache 114 for faster retrieval.

Figure 5:
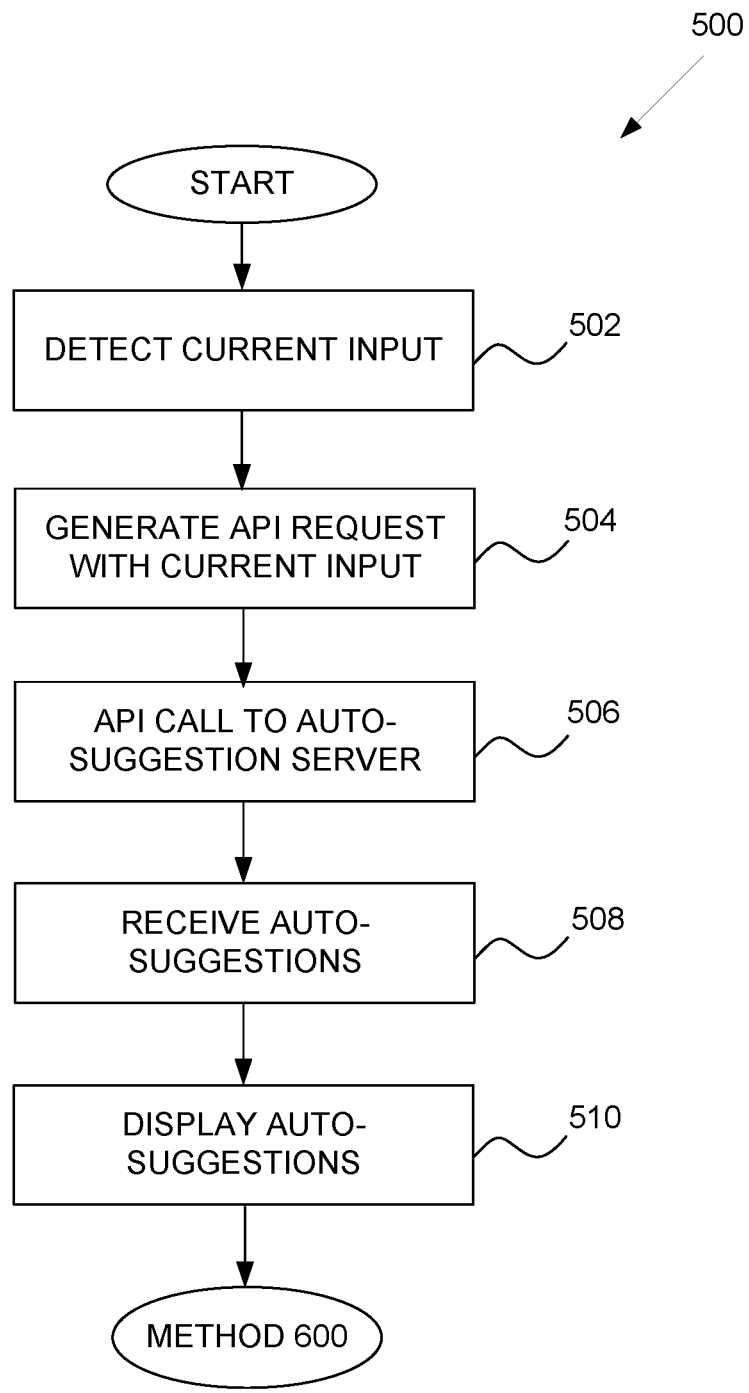
FIG. 5 is a flowchart illustrating operations of a method for obtaining auto-suggestion keywords at the browser, according to some example embodiments.

FIG. 5 is a flowchart illustrating operations of a method 500 for obtaining auto-suggestion keywords at the browser 104, according to some example embodiments. Operations in the method 500 may be performed by the browser 104, using modules described above with respect to FIG. 2. Accordingly, the method 500 is described by way of example with reference to the browser 104. However, it shall be appreciated that at least some of the operations of the method 500 may be deployed on various other hardware configurations or be performed by similar components residing elsewhere in the network environment 100. Therefore, the method 500 is not intended to be limited to the browser 104.

In operation 502, a current input is detected by the input module 202. In example embodiments, the input module 202 monitors the input as the user is entering characters in the search field. For example, the input module 202 detects a current input of "ipa."

In operation 504, an auto-suggestion API request is created. In example embodiments, as soon as a predetermined number of characters has been entered into the search field (e.g., three characters), the input module 202 triggers the auto-suggestion module 204 to generate the auto-suggestion API request using the current input (e.g., currently entered characters) obtained from the input module 202 as a parameter.

In operation 506, an auto-suggestion API call is made to the auto-suggestion server 108. Accordingly, the auto-suggestion module 204 transmits the auto-suggestion API request (e.g., makes the auto-suggestion API call) to the auto-suggestion server 108.

In response, the auto-suggestion module 204 receives a list of one or more auto-suggestions (assuming any are available) in operation 508. The auto-suggestions comprise keywords, terms, or phrases that correspond to the current input. Continuing with the example from above, the auto-suggestions returned for the current input "ipa" may comprise, for example, ipad, ipad air, ipad air 2, ipad mini, and ipad mini case.

In operation 510, the auto-suggestions are displayed to the user. In example embodiments, the auto-suggestion module 204 sends the auto-suggestions to the display module 208 which presents the auto-suggestions, for example, in a drop down menu under the search field. Accordingly, the display module 208 updates the user interface to display the auto-suggestions. As the user continues to enter characters into the search field, the auto-suggestions may be updated. In some embodiments, the auto-suggestion module 204 may make further calls to the auto-suggestion server 108 with each successively entered character. In other embodiments, the auto-suggestion module 204 already has the updated auto-suggestions based on a previous auto-suggestion API call and provides the updated auto-suggestions to the display module 208 for update to the user interface. The method then proceeds to the operations of method 600 of FIG. 6.

Figure 6:
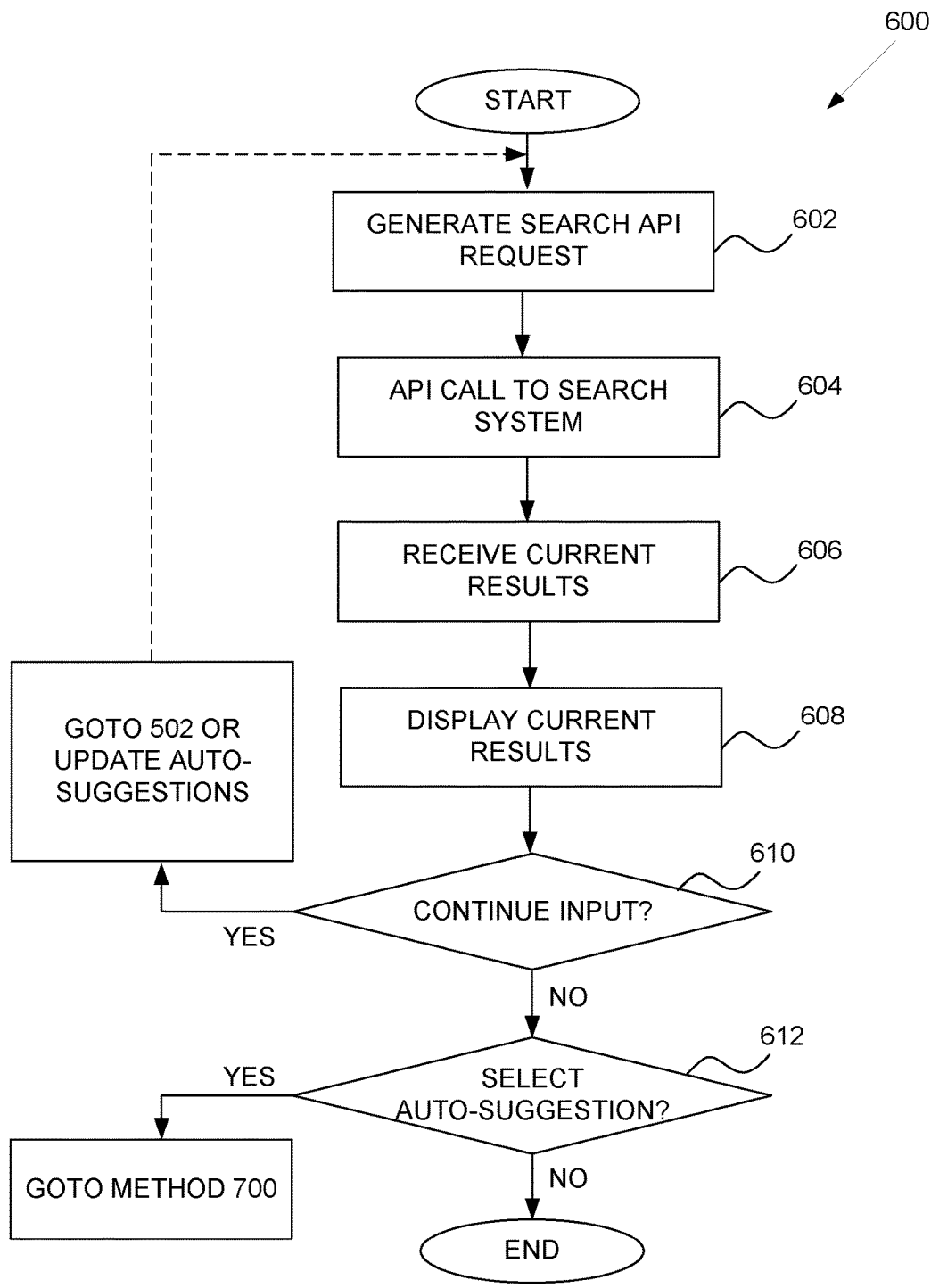
FIG. 6 is a flowchart illustrating operations of a method for obtaining current results at the browser, according to some example embodiments.

FIG. 6 is a flowchart illustrating operations of the method 600 for obtaining current results at the browser 104, according to some example embodiments. The current results are results that correspond to the current input. Operations in the method 600 may be performed by the browser 104, using modules described above with respect to FIG. 2. Accordingly, the method 600 is described by way of example with reference to the browser 104. However, it shall be appreciated that at least some of the operations of the method 600 may be deployed on various other hardware configurations or be performed by similar components residing elsewhere in the network environment 100. Therefore, the method 600 is not intended to be limited to the browser 104.

In operation 602, a search API request is generated by the search module 206. The search API request includes both the current input (e.g., "ipa") and one or more auto-suggestions (e.g., ipad, ipad air, ipad air 2, ipad mini, and ipad mini case) as parameters. In some example embodiments, the search module 206 automatically generates the search API request in response to the auto-suggestion module 204 receiving the list of auto-suggestions from the auto-suggestion server 108.

In operation 604, a search API call is made to the search system 116. Accordingly in example embodiments, the search module 206 transmits the search API request (e.g., makes the search API call) to the search system 116 (e.g., to the cache system server 110). The search module 206 receives, in response to the search API call, results for the current input (also referred to as "current results") in operation 606. In some embodiments, the current results comprise some of the results determined, by the search server 112, for one or more of the auto-suggestions.

In operation 608, the current results are displayed on the user interface to the user. In example embodiments, the display module 208 causes display of the current results received from the cache server 110 or the search server 112, for example, by updating the user interface to include the current results. In example embodiments, the current results are displayed while the user may still be inputting characters in the search field.

In operation 610, a determination is made as to whether the user is continuing to input characters in the search field. In example embodiments, the input module 202 continues to monitor the search field for a next character. If a further character is inputted, then the method 600 may return to operation 502, where the input module 502 detects the new current input and generate a new auto-suggestion API request.

Alternatively, if the browser 104 already has the auto-suggestions for the new current input, the user interface is updated to show the auto-suggestions for the new current input. For example, a previous current input may be "ipa" and a new current input may be "ipad." In this example, the browser 104 already has the auto-suggestions of, for example, ipad, ipad air, ipad air 2, ipad mini, and ipad mini case, so a new auto-suggestion API request is not needed. In this embodiment, the method 600 returns to operation 602 where a new search API request comprising at least the new current input as a parameter is generated and transmitted in operation 604 to the search system 116. In response, a set of new current results is received in operation 606 and displayed in operation 608.

If no further inputs are detected in operation 610, then a determination is made in operation 612 as to whether a selection of an auto-suggestion is received. As previously discussed, the auto-suggestions are displayed to the user, for example, in a drop down menu under the search field in operation 510. In operation 612, the input module 202 monitors for a selection of one of the auto-suggestions. If a selection is detected, then a method 700 is performed.

Figure 7:
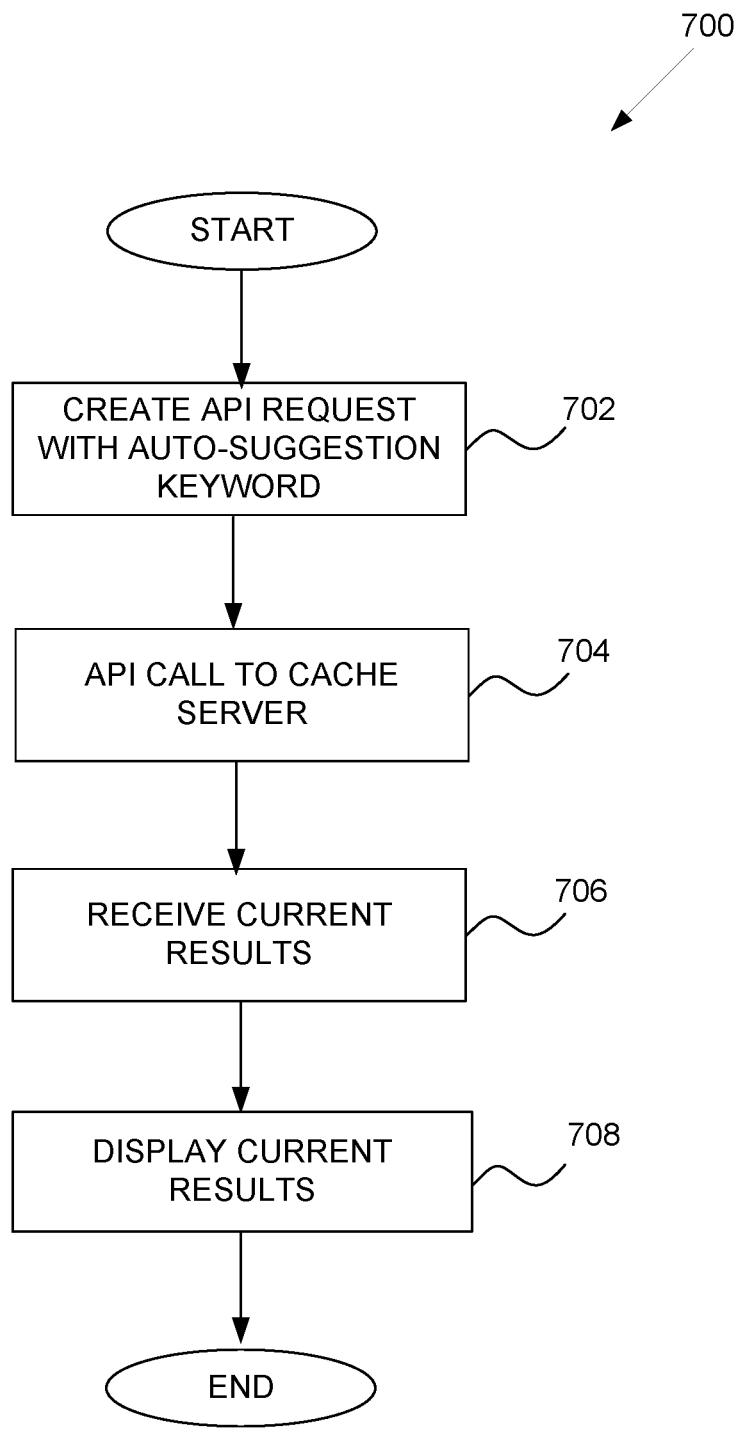
FIG. 7 is a flowchart illustrating operations of a method for obtaining results based on a selected auto-suggestion, according to some example embodiments.

Referring now to FIG. 7, is a flowchart illustrating operations of the method 700 for obtaining results based on the selected auto-suggestion, according to some example embodiments. Operations in the method 700 may be performed by the browser 104, using modules described above with respect to FIG. 2. Accordingly, the method 700 is described by way of example with reference to the browser 104. However, it shall be appreciated that at least some of the operations of the method 700 may be deployed on various other hardware configurations or be performed by similar components residing elsewhere in the network environment 100. Therefore, the method 700 is not intended to be limited to the browser 104.

In operation 702, a search API request using the selected auto-suggestion (which is now the current input) as a parameter is generated by the search module 206. Returning to the above example, the selected auto-suggestion is "ipad air 2."

In operation 704, a search API call is made to the search system 116 with the search API request that includes the selected auto-suggestion as the parameter. Accordingly in example embodiments, the search module 206 transmits the search API request that includes the select auto-suggestion to the cache system server 110. The search module 206 receives, in response to the search API call, results for the selected auto-suggestion (also referred to as the "current results") in operation 706. Because the auto-suggestion was previously transmitted in the search API request of operations 602 and 604, the current results are stored in the cache 114 for faster retrieval by the cache server 110. Accordingly, the current results received in operation 706 will be obtained more quickly than if a search of the search server 112 were to be performed for the current results upon receipt of the search API call.

In operation 708, the current results are displayed on the user interface to the user. In example embodiments, the display module 208 generates and causes display of the current results (or updates a current user interface to display the current results) received from the search system 116.

Figure 8:
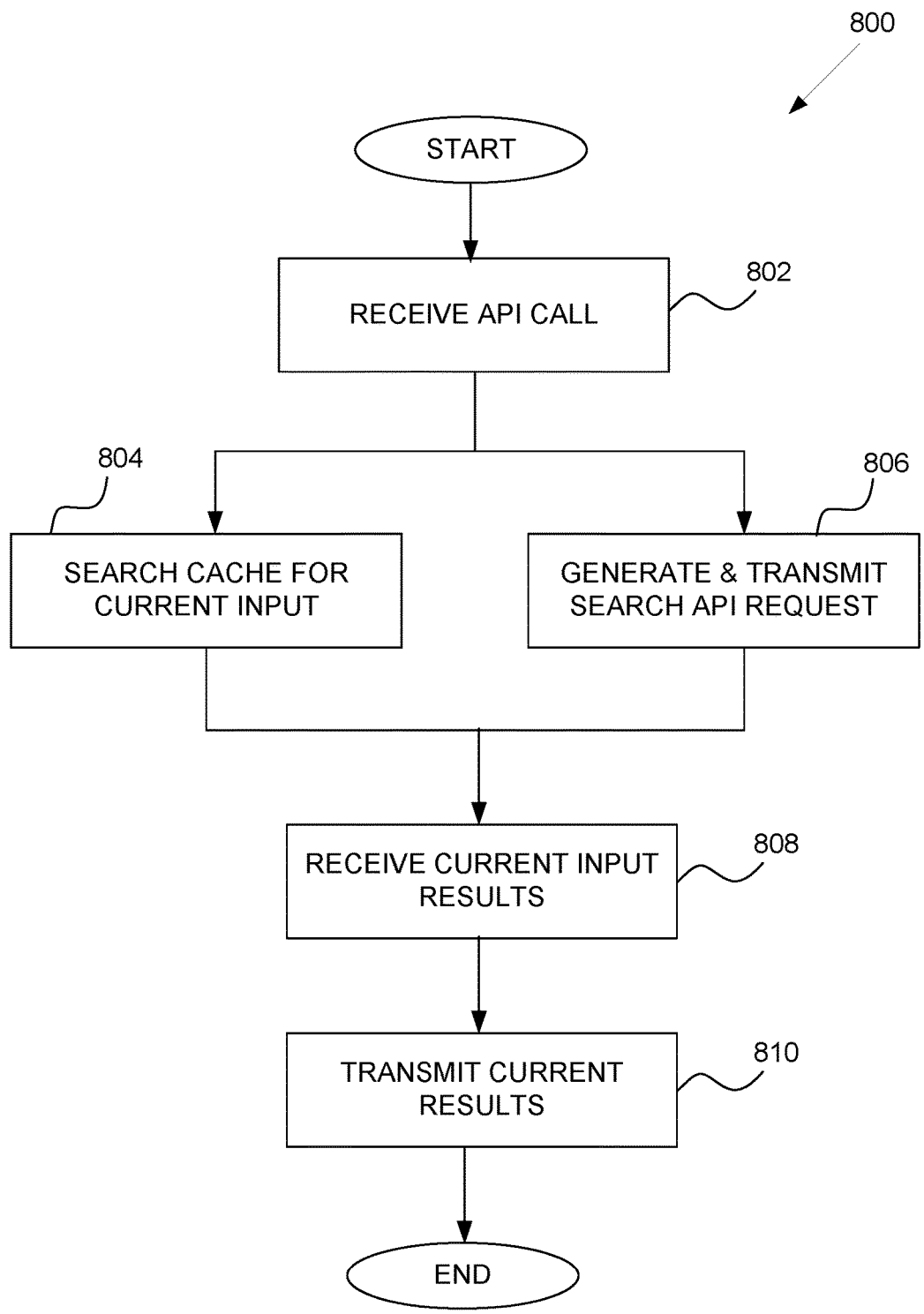
FIG. 8 is a flowchart illustrating operations of a method for providing current input results at the cache server, according to some example embodiments.

FIG. 8 is a flowchart illustrating operations of a method 800 for providing current input results at the cache server 110, according to some example embodiments. Operations in the method 800 may be performed by the cache server 110, using modules described above with respect to FIG. 3. Accordingly, the method 800 is described by way of example with reference to the cache server 110. However, it shall be appreciated that at least some of the operations of the method 800 may be deployed on various other hardware configurations or be performed by similar components residing elsewhere in the network environment 100. Therefore, the method 800 is not intended to be limited to the cache server 110.

In operation 802, a search API call is received by the communication module 302 from the browser 104 (e.g., from the search module 206). In some embodiments, the communication module 302 parses the search API request to identify the current input and the auto-suggestion parameters.

Next, the cache server 110 obtains the results for the current input ("current results"). Accordingly in operation 804, the cache module 304 receives the current input from the communication module 302 and searches the cache 114 to determine if the cache 114 contains the results for the current input. Substantially simultaneously, the search module 306 receives the current input and generates a current search API request that includes the current input in operation 806. The current search API requests is transmitted (e.g., a current search API call is made) to the search server 112.

In operation 808, the current results are obtained by the communication module 302. In example embodiments, the communication module 302 awaits the current results from either the cache module 304, which returns results from the cache 114 if they exists, or the search module 306, which returns results from the search server 112. Whichever set of current results is obtained first by the communication module 302 will be used to generate a response to the search API call that is transmitted back to the browser 104 in operation 810. In an alternative embodiment, the cache server 110 searches the cache 114 first for the current results, and if no results are found, then sends the current search API request to the search server 112. This embodiment reduces the number of calls made to the search server 112 when the requested information is already cached at the cache 114.

Figure 9:
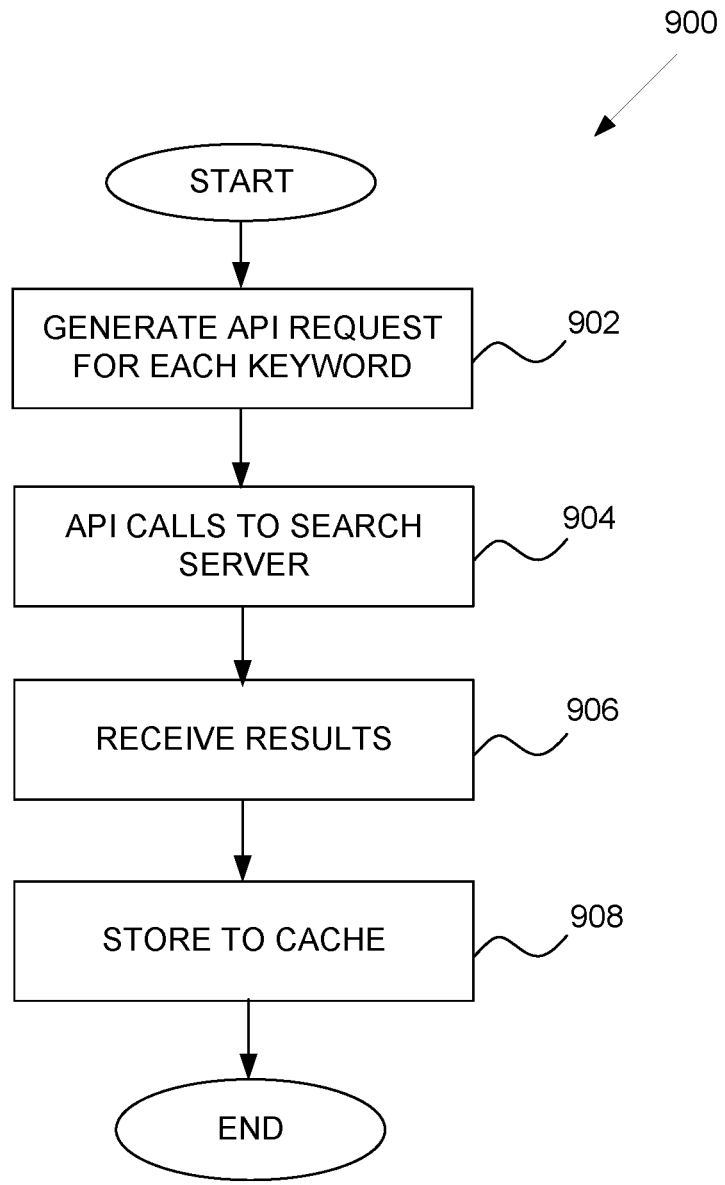
FIG. 9 is a flowchart illustrating operations of a method for caching predicted results at the cache server, according to some example embodiments.

FIG. 9 is a flowchart illustrating operations of a method 900 for caching predicted results at the cache server 110, according to some example embodiments. Operations in the method 900 may be performed by the cache server 110, using modules described above with respect to FIG. 3. Accordingly, the method 900 is described by way of example with reference to the cache server 110. However, it shall be appreciated that at least some of the operations of the method 900 may be deployed on various other hardware configurations or be performed by similar components residing elsewhere in the network environment 100. Therefore, the method 900 is not intended to be limited to the cache server 110.

In operation 902, the search module 306 generates an auto-suggestion search API request for each of the auto-suggestions (also referred to as "auto-suggestion search request"). In some embodiments, the search module 306 may generate auto-suggestions search requests for a first set of auto-suggestions (e.g., first 5 auto-suggestions) instead of for all the auto-suggestions. In operation 904, the one or more generated auto-suggestion search requests are transmitted (e.g., auto-suggestion search calls are made) to the search server 112 by the search module 306. Auto-suggestion results are received in operation 906 by the search module 306. The search module 306 provides the auto-suggestion results to the cache module 304, which stores the auto-suggestion results to the cache 114 in operation 908.

Figure 10:
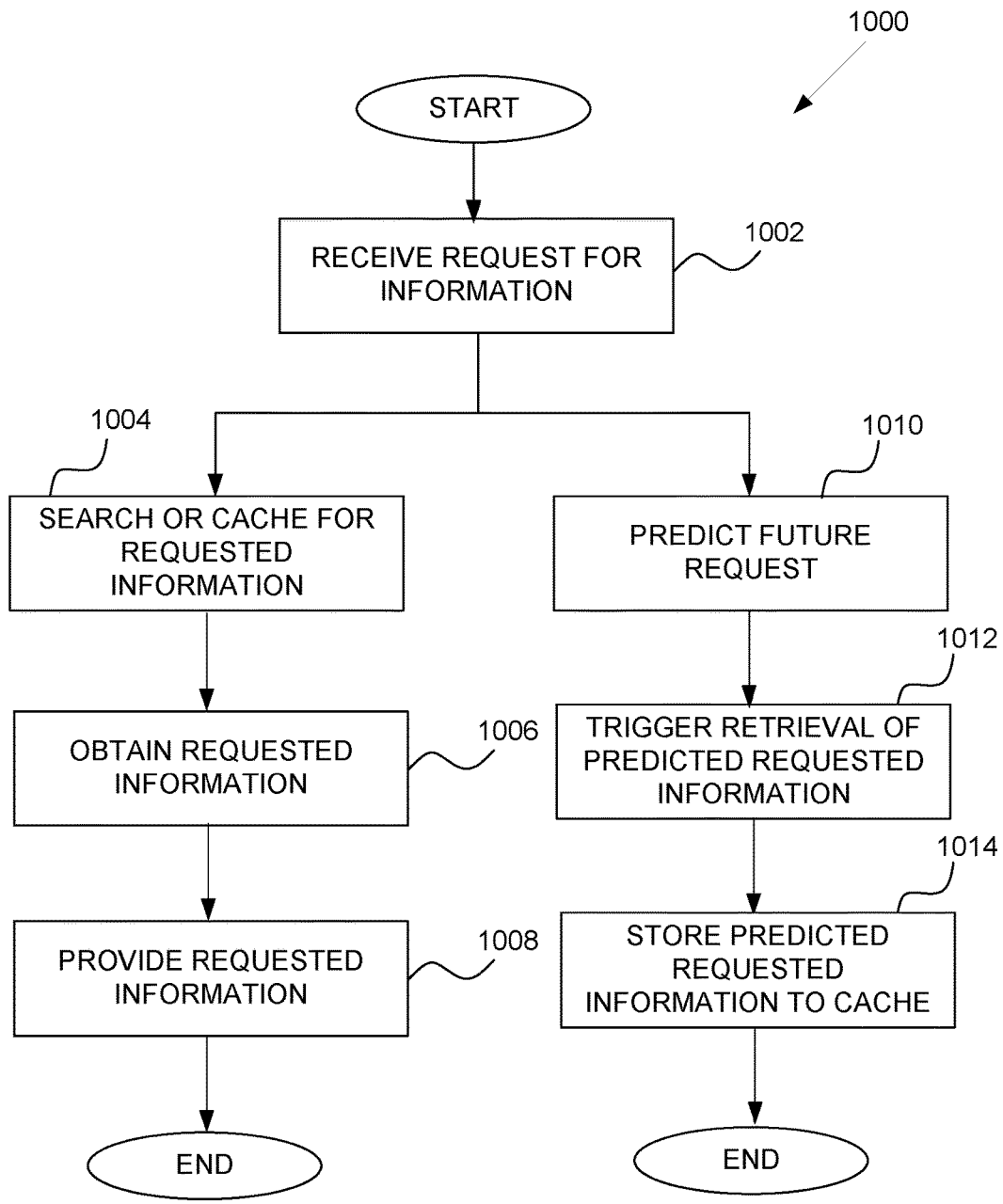
FIG. 10 is a flowchart illustrating operations of a method for managing prediction-based results at the cache server, according to some example embodiments.

FIG. 10 is a flowchart illustrating operations of a method 1000 for managing prediction-based results at the cache server 110, according to some example embodiments. Operations in the method 1000 may be performed by the cache server 110, using modules described above with respect to FIG. 3. Accordingly, the method 1000 is described by way of example with reference to the cache server 110. However, it shall be appreciated that at least some of the operations of the method 1000 may be deployed on various other hardware configurations or be performed by similar components residing elsewhere in the network environment 100. Therefore, the method 1000 is not intended to be limited to the cache server 110.

While previous embodiments were discussed with the cache server 110 providing search results based on user inputs (e.g., current input or request for current requested information) or selected auto-suggestions (e.g., prediction for future requested information) and caching predicted results for auto-suggestions, the cache server 110 is operable to provide information based on any current input for current requested information and prediction for future requested information. For example, the cache server 110 may provide information for display of maps. A current input may be a request for a map of the United States. The components of the cache server 110 provides the map of the United States as current requested information and predicts that the user may request a map of a state. As a result, the cache server 110 preemptively obtains maps of the states and stores these state maps in the cache 114. When the user requests information for a particular portion of the U.S. map (e.g., a map of California), the cache server 110 retrieves the information for the particular portion from the cache 114 instead of performing a search for the information after receiving the request. The cache server 110 provides the information for the particular portion and makes a prediction for a next set of future requested information (e.g., map of major cities within California). The cache server 110 may preemptively perform a search for the predicted next set of future requested information (also referred to as "predicted results") and stores the predicted results in the cache 114.

As another example, components of the cache server 110 can be used to predict and cache information in browsing any directory structure, such as directories in a computer or folders in an online mailbox. In a further example, the cache server 110 can be used with respect to devices such as e-book readers or within a search, itself, for pagination. That is, the components of the cache server 110 caches results from page two when the user is browsing page one, cache results from page three when the user is on page two, and so forth. In a video game embodiment, components of the cache server 110 can be used to fetch subsequent levels or environments of the game and store that information in the cache 114 for faster retrieval (e.g., retrieving content of all rooms that are attached to a room that a player is currently in). As such, components of the cache server 110 can be used to retrieve and cache results for any predicted future information request. In some embodiments, some or all of the components of the cache server 110 may be located at the user device (e.g., user device 102) or at another system/server (e.g., email server, gaming system) in order to enable these operations.

In operation 1002, a request for information is received by the communication module 302. In one embodiment, the request may be an API call from a browser (e.g., browser 104) or another component of a user device (e.g., user device 102). In some embodiments, the communication module 302 parses the request to identify a current request for information and predicted future requests for information (e.g., auto-suggestions) if provided.

In operation 1004, the cache module 304 receives the request from the communication module 302 and checks the cache 114 to determine if the cache 114 contains the current requested information (e.g., current results). In some embodiments, the search module 306 also receives the request and performs a search for the current requested information in operation 1004.

In operation 1006, the current requested information is obtained by the communication module 302. In some embodiments, the communication module 302 awaits the current requested information from either the cache module 304, which obtains the current requested information from the cache 114 if previously cached from a source (e.g., via a search previously performed by the search server 112), or the search module 306, which obtains the current requested information from the source (e.g., via a search currently performed by the search server 112) after the request is received. Whichever set of requested information is obtained first by the communication module 302 will be provided in operation 1008.

Substantially simultaneously as the current requested information is obtained and provided, predicted future requested information or predicted results are obtained. Accordingly in operation 1010, the prediction module 308 predicts future requests for information (also referred to as "predicted requests"). The prediction may be based on historical information (e.g., previous current request for information resulted in the predicted future requests) or hierarchical information (e.g., directory information, folder information) that is accessed by the prediction module 308 (e.g., from a data store). For example, if a current request is for a map of the United States, the predicted requests (also referred to as the "predicted request") may be for maps of various regions within the United States. In another example, if the current request is for particular directory or folder in a computer system, the predicted requests may be for each sub-directory within the particular directory or each sub-folder within the particular folder. In yet another example, if the current request is for a particular page, the predicted requests may be for a next one or more pages after the particular page. Further still, in a video game example, the current request is for a particular environment or level, and the predicted requests may be for surrounding environments or levels. In embodiments where the predicted requests is received in the request (e.g., auto-suggestion), operation 1010 is optional.

In operation 1012, retrieval of the predicted results is triggered. In embodiments where the predicted results are located at another system or server (e.g., a source), the search module 306 sends an API request to the other system or server to obtain the predicted results. In embodiments where the predicted results are within the same system or server as the search module 306, the search module 306 will obtain the predicted results via a local network connection (e.g., bus).

In operation 1014, the predicted results are stored in the cache 114 for potential future retrieval. In example embodiments, the cache module 304 stores the predicted results in the cache 114.

As such, example embodiments take predictions of potential future requested information, retrieves the predicted results, and caches the predicted results for faster retrieval. In some embodiments, the cached information is shared between different users. When these operations are considered in aggregate, one or more of the methodologies described herein may obviate a need for certain efforts or resources that otherwise would be involved in performing searches upon request or performing redundant searches. This may provide the technical effect of saving input/output time on servers since the servers are not holding onto sockets as long. The servers are also able to process results much faster, which results in the servers being able to handle more queries versus conventional systems. Further still, a load on the search server's API can be reduced by the use of the cache 114. As an aggregate, computing resources used by one or more machines, databases, or devices (e.g., within the network environment 100) may be reduced. Examples of such computing resources include processor cycles, network traffic, memory usage, data storage capacity, power consumption, and cooling capacity.

Figure 11:
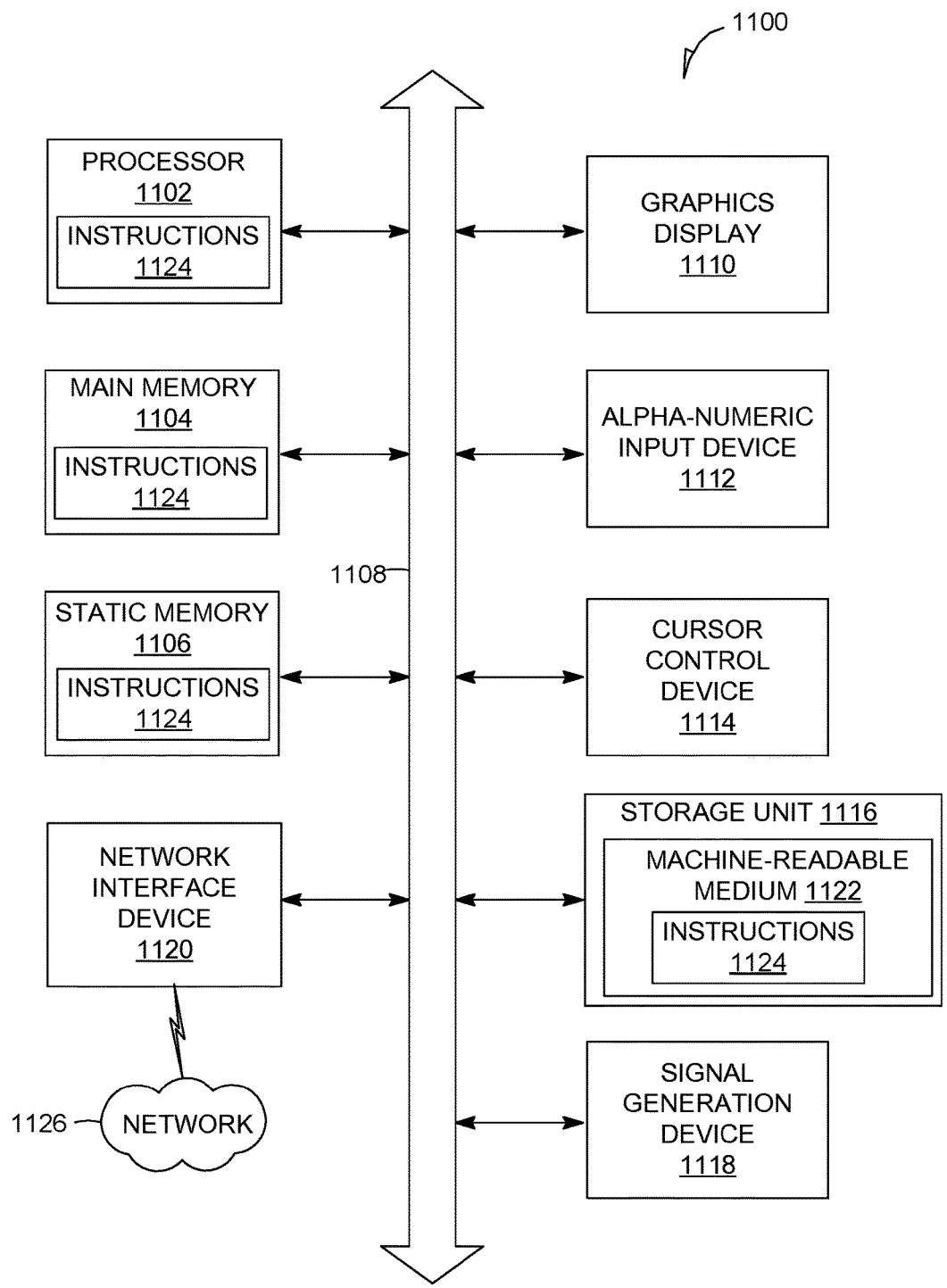
FIG. 11 is a block diagram illustrating components of a machine, according to some example embodiments, able to read instructions from a machine-readable medium and perform any one or more of the methodologies discussed herein.

FIG. 11 illustrates components of a machine 1100, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 11 shows a diagrammatic representation of the machine 1100 in the example form of a computer device (e.g., a computer) and within which instructions 1124 (e.g., software, a program, an application, an applet, an app, or other executable code) for causing the machine 1100 to perform any one or more of the methodologies discussed herein may be executed, in whole or in part.

For example, the instructions 1124 may cause the machine 1100 to execute the flow diagrams of FIGS. 5 through 10. In one embodiment, the instructions 1124 can transform the general, non-programmed machine 1100 into a particular machine (e.g., specially configured machine) programmed to carry out the described and illustrated functions in the manner described.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, or a cathode ray tube (CRT), or any other display capable of displaying graphics or video). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes a machine-readable medium 1122 (e.g., a tangible machine-readable storage medium) on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered as machine-readable media (e.g., tangible and non-transitory machine-readable media). The instructions 1124 may be transmitted or received over a network 1126 (e.g., network 106) via the network interface device 1120.

In some example embodiments, the machine 1100 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1122 able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium, or combination of multiple media, that is capable of storing instructions (e.g., software) for execution by the machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device."

Furthermore, the machine-readable medium 1122 is non-transitory in that it does not embody a propagating or transitory signal. However, labeling the machine-readable medium 1122 as "non-transitory" should not be construed to mean that the medium is incapable of movement—the medium should be considered as being transportable from one physical location to another. Additionally, since the machine-readable medium 1122 is tangible, the medium may be considered to be a tangible machine-readable storage device.

In some example embodiments, the instructions 1124 for execution by the machine 1100 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1124)

The instructions 1124 may further be transmitted or received over a communications network 1126 using a transmission medium via the network interface device 1120 and utilizing any one of a number of well-known transfer protocols (e.g., HTTP). Examples of communication networks 1126 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving an application program interface (API) request from a client device, the request indicating a parameter for current requested information;
   causing a search of both a cache and a source for the current requested information based on the parameter;
   causing retrieval of the current requested information from one of the cache or the source;
   transmitting, using a hardware processor, the current requested information to the client device;
   determining a predicted request for information based on the current requested information;
   retrieving predicted results, from the source, based on the predicted request; and
   storing the predicted results in the cache, wherein the predicted results are stored in the cache for a predetermined period of time and are shared among different users at different user devices.

2. The method of claim 1, wherein the causing retrieval from the source comprises:
   generating a search application program interface (API) request, the search API request including current requested information as a parameter;
   transmitting, over a network, the search API request to the source; and
   in response to the transmitting the search API request, receiving results based on the current requested information.

3. The method of claim 1, wherein the request includes the predicted request for information.

4. The method of claim 3, wherein the predicted request comprises an auto-suggestion for a search term.

5. The method of claim 1, wherein the transmitting the current requested information comprises transmitting the current requested information from whichever of the cache or the source returns the current requested information first.

6. The method of claim 1, wherein the cache is searched first and the source for the current requested information is subsequently searched when the current requested information is not found in the cache.

7. The method of claim 1, wherein the current requested information comprises directory information and the predicted results comprise information for a sub-directory or sub-file.

8. The method of claim 1, wherein the current requested information comprises a first page of information and the predicted results comprise one or more further pages of information.

9. The method of claim 1, wherein the current requested information comprises a portion of a game and the predicted results comprise one or more adjoining portions or levels of the game.

10. The method of claim 1, wherein the current requested information comprises a map of an area and the predicted results comprises maps of sub-portions of the area.

11. A machine-readable hardware storage device storing instructions that, when executed by one or more processors of a machine, cause the machine to perform operations comprising:
    receiving an application program interface (API) request from a component of the client device, the request indicating a parameter for current requested information;
    causing a search of both a cache and a source for the current requested information based on the parameter;
    causing retrieval of the current requested information from one of the cache or the source;
    transmitting the current requested information to the component of the client device;
    determining a predicted request for information based on the current requested information;
    retrieving predicted results, from the source, based on the predicted request; and
    storing the predicted results in the cache, wherein the predicted results are stored in the cache for a predetermined period of time and are shared among different users at different user devices.

12. A system comprising:
    a storage device storing instructions; and
    one or more hardware processors configured by the instructions to perform operations comprising:
    receiving an application program interface (API) request from a component of the client device, the request indicating a parameter for current requested information;
    causing a search of both a cache and a source for the current requested information based on the parameter;
    causing retrieval of the current requested information from one of the cache or the source; and
    transmitting the current requested information to the component of the client device;
    determining a predicted request for information based on the current requested information;
    retrieving predicted results, from the source, based on the predicted request; and
    storing the predicted results in the cache, wherein the predicted results are stored in the cache for a predetermined period of time and are shared among different users at different user devices.

13. A method comprising:
receiving an application program interface (API) request from a client device, the request indicating a parameter for current requested information;
causing a search of both a cache and a source for the current requested information based on the parameter, wherein the cache is searched first and the source for the current requested information is subsequently searched when the current requested information is not found in the cache;
causing retrieval of the current requested information from one of the cache or the source;
transmitting, using a hardware processor, the current requested information to the client device;
determining a predicted request for information based on the current requested information;
retrieving predicted results, from the source, based on the predicted request; and
storing the predicted results in the cache, wherein the predicted results are stored in the cache for a predetermined period of time.

14. The method of claim 13, wherein the causing retrieval from the source comprises:
generating a search application program interface (API) request, the search API request including current requested information as a parameter;
transmitting, over a network, the search API request to the source; and
in response to the transmitting the search API request, receiving results based on the current requested information.

15. The method of claim 13, wherein the request includes the predicted request for information.

16. The method of claim 15, wherein the predicted request comprises an auto-suggestion for a search term.

17. The method of claim 13, wherein the transmitting the current requested information comprises transmitting the current requested information from whichever of the cache or the source returns the current requested information first.

18. The method of claim 13, wherein the current requested information comprises directory information and the predicted results comprise information for a sub-directory or sub-file.

19. The method of claim 13, wherein the current requested information comprises a first page of information and the predicted results comprise one or more further pages of information.

20. The method of claim 13, wherein the current requested information comprises a portion of a game and the predicted results comprise one or more adjoining portions or levels of the game.

21. The method of claim 13, wherein the current requested information comprises a map of an area and the predicted results comprises maps of sub-portions of the area.

22. A machine-readable hardware storage device storing instructions that, when executed by one or more processors of a machine, cause the machine to perform operations comprising:
receiving an application program interface (API) request from a client device, the request indicating a parameter for current requested information;
causing a search of both a cache and a source for the current requested information based on the parameter, wherein the cache is searched first and the source for the current requested information is subsequently searched when the current requested information is not found in the cache;
causing retrieval of the current requested information from one of the cache or the source;
transmitting, using a hardware processor, the current requested information to the client device;
determining a predicted request for information based on the current requested information;
retrieving predicted results, from the source, based on the predicted request; and
storing the predicted results in the cache, wherein the predicted results are stored in the cache for a predetermined period of time.

23. A system comprising:
a storage device storing instructions; and
one or more hardware processors configured by the instructions to perform operations comprising:
receiving an application program interface (API) request from a client device, the request indicating a parameter for current requested information;
causing a search of both a cache and a source for the current requested information based on the parameter, wherein the cache is searched first and the source for the current requested information is subsequently searched when the current requested information is not found in the cache;
causing retrieval of the current requested information from one of the cache or the source;
transmitting, using a hardware processor, the current requested information to the client device;
determining a predicted request for information based on the current requested information;
retrieving predicted results, from the source, based on the predicted request; and
storing the predicted results in the cache, wherein the predicted results are stored in the cache for a predetermined period of time.

24. A method comprising:
receiving an application program interface (API) request from a client device, the request indicating a parameter for current requested information;
causing a search of both a cache and a source for the current requested information based on the parameter, wherein the cache is searched first and the source for the current requested information is subsequently searched when the current requested information is not found in the cache;
causing retrieval of the current requested information from one of the cache or the source;
transmitting, using a hardware processor, the current requested information to the client device;
determining a predicted request for information based on the current requested information;
retrieving predicted results, from the source, based on the predicted request; and
storing the predicted results in the cache, wherein the predicted results stored in the cache are shared among different users at different user devices.

25. The method of claim 24, wherein the causing retrieval from the source comprises:
generating a search application program interface (API) request, the search API request including current requested information as a parameter;
transmitting, over a network, the search API request to the source; and
in response to the transmitting the search API request, receiving results based on the current requested information.

26. The method of claim 24, wherein the request includes the predicted request for information.

27. The method of claim 26, wherein the predicted request comprises an auto-suggestion for a search term.

28. The method of claim 24, wherein the transmitting the current requested information comprises transmitting the current requested information from whichever of the cache or the source returns the current requested information first.

29. The method of claim 24, wherein the current requested information comprises directory information and the predicted results comprise information for a sub-directory or sub-file.

30. The method of claim 24, wherein the current requested information comprises a first page of information and the predicted results comprise one or more further pages of information.

31. The method of claim 24, wherein the current requested information comprises a portion of a game and the predicted results comprise one or more adjoining portions or levels of the game.

32. The method of claim 24, wherein the current requested information comprises a map of an area and the predicted results comprises maps of sub-portions of the area.

33. A machine-readable hardware storage device storing instructions that, when executed by one or more processors of a machine, cause the machine to perform operations comprising:
    receiving an application program interface (API) request from a client device, the request indicating a parameter for current requested information;
    causing a search of both a cache and a source for the current requested information based on the parameter, wherein the cache is searched first and the source for the current requested information is subsequently searched when the current requested information is not found in the cache;
    causing retrieval of the current requested information from one of the cache or the source;
    transmitting, using a hardware processor, the current requested information to the client device;
    determining a predicted request for information based on the current requested information;
    retrieving predicted results, from the source, based on the predicted request; and
    storing the predicted results in the cache, wherein the predicted results stored in the cache are shared among different users at different user devices.

34. A system comprising:
    a storage device storing instructions; and
    one or more hardware processors configured by the instructions to perform operations comprising:
    receiving an application program interface (API) request from a client device, the request indicating a parameter for current requested information;
    causing a search of both a cache and a source for the current requested information based on the parameter, wherein the cache is searched first and the source for the current requested information is subsequently searched when the current requested information is not found in the cache;
    causing retrieval of the current requested information from one of the cache or the source;
    transmitting, using a hardware processor, the current requested information to the client device;
    determining a predicted request for information based on the current requested information;
    retrieving predicted results, from the source, based on the predicted request; and
    storing the predicted results in the cache, wherein the predicted results stored in the cache are shared among different users at different user devices.

* * * * *